(12) United States Patent
Kao

(10) Patent No.: US 11,854,512 B2
(45) Date of Patent: Dec. 26, 2023

(54) DISPLAY DEVICE AND METHOD OF IMAGE REWINDING THEREOF

(71) Applicants: GIGA-BYTE TECHNOLOGY CO., LTD., New Taipei (TW); GIGAIPC CO., LTD., New Taipei (TW)

(72) Inventor: Chin-Jun Kao, New Taipei (TW)

(73) Assignees: GIGA-BYTE TECHNOLOGY CO., LTD., New Taipei (TW); GIGAIPC CO., LTD, New Taipei (TW)

( * ) Notice: Subject to any disclaimer, the term of this patent is extended or adjusted under 35 U.S.C. 154(b) by 0 days.

(21) Appl. No.: 18/080,863

(22) Filed: Dec. 14, 2022

(65) Prior Publication Data
US 2023/0197033 A1 Jun. 22, 2023

(30) Foreign Application Priority Data
Dec. 20, 2021 (TW) .................................. 110147618

(51) Int. Cl.
G09G 5/00 (2006.01)
H04N 21/6587 (2011.01)
(52) U.S. Cl.
CPC .......... *G09G 5/006* (2013.01); *H04N 21/6587* (2013.01); *G09G 2354/00* (2013.01)
(58) Field of Classification Search
CPC .................................................... G09G 5/006
See application file for complete search history.

(56) References Cited

U.S. PATENT DOCUMENTS

| 2012/0242700 | A1 | 9/2012 | Osuga et al. |
| 2018/0020259 | A1* | 1/2018 | Kim ..................... H04N 21/472 |

FOREIGN PATENT DOCUMENTS

| CN | 107071532 A | 8/2017 |
| CN | 107211181 A | 9/2017 |
| CN | 111921197 A | 11/2020 |
| TW | 201101818 A1 | 1/2011 |

OTHER PUBLICATIONS

Office Action and Search Report issued in Taiwanese Application No. 110147618, dated Oct. 31, 2022.

* cited by examiner

*Primary Examiner* — Gustavo Polo
(74) *Attorney, Agent, or Firm* — Birch, Stewart, Kolasch & Birch, LLP

(57) ABSTRACT

A display device is provided, which includes an image buffer, a display module, and a display controller. The display controller is used for receiving an image signal from a host, and storing the image signal in the image buffer. In response to the display controller receiving a trigger signal, the display controller controls the display device to enter an image-rewinding mode. The display controller obtains a retrospective image that corresponds to a retrospective time point according to a user command, and plays the retrospective image on the display module.

14 Claims, 3 Drawing Sheets

DISPLAY DEVICE AND METHOD OF IMAGE REWINDING THEREOF

CROSS REFERENCE TO RELATED APPLICATIONS

This application claims priority of Taiwan Patent Application No. 110147618, filed on Dec. 20, 2021, the entirety of which is incorporated by reference herein.

BACKGROUND OF THE INVENTION

Field of the Invention

The present disclosure relates in general to a display device, and it relates particularly to a display device and a method of image rewinding thereof.

Description of the Related Art

Computer users spend more and more time using monitors every day. However, when operating a computer, a user will often forget the operation that was just performed, and is therefore unable to return to a previous step when desired. Alternatively, a user may want to view a previously viewed image. However, conventional display devices do not have a "rewind" function for images, and this can be inconvenient for users.

BRIEF SUMMARY OF THE INVENTION

Accordingly, a display device and an image rewinding method thereof is provided by the present disclosure to solve the above problems.

A display device is provided by the present disclosure. The display device includes an image buffer, a display module, and a display controller. The display controller is used for receiving an image signal from a host, and storing the image signal in the image buffer. In response to the display controller receiving a trigger signal, the display controller controls the display device to enter an image-rewinding mode. The display controller obtains a retrospective image that corresponds to a retrospective time point according to a user command, and plays the retrospective image on the display module.

In some embodiments, the display controller compresses the image signal to obtain a compressed image signal, and stores the compressed image signal to the image buffer. When the display device is in the image-rewinding mode, the display controller obtains the compressed image signal that corresponds to the retrospective time point from the image buffer, and decompresses the compressed image signal to obtain the retrospective image.

In some embodiments, the image buffer stores the compressed image signal within a predetermined period of time, and the display controller stores the compressed image signal to the image buffer using a first-in-first-out mechanism.

In some embodiments, the display device further includes an input interface. The input interface includes a first function button, a second function button, and a third function button. The second function button is used for generating the trigger signal to enable or disable the image-rewinding mode of the display device. The first function button and the third function button are used for generating the user command, and to respectively control a play-backward function and a play-forward function in the image-rewinding mode.

In some embodiments, when the display device is in the image-rewinding mode and a user presses and then releases the first function button or the third function button, the display controller obtains the retrospective time point by searching forward or backward for a predetermined number of seconds from a current search time point, and obtains the retrospective image that corresponds to the retrospective time point from the image buffer.

In some embodiments, when the display device is in the image-rewinding mode and a user holds down the first function button or the third function button, the display controller searches for the retrospective image fast forward or backward from a current search time point.

In some embodiments, when the display device is in the image-rewinding mode and the display controller receives the trigger signal from the second function button, the display controller controls the display device to return to a normal image mode.

In some embodiments, the display controller stops writing the image signal to the image buffer, in response to the display device entering the image-rewinding mode.

An image rewinding method of a display device is further provided by the present disclosure. The display device includes an image buffer, a display module, and a display controller. The method includes the step of using the display controller to receive an image signal from a host, and to store the signal to the image buffer. The method further includes the step of using the display controller to control the display device to enter an image-rewinding mode, in response to the display controller receiving a trigger signal. The method further includes the step of using the display controller to obtain a retrospective image that corresponds to a retrospective time point according to a user command, and to play the retrospective image on the display module.

BRIEF DESCRIPTION OF THE DRAWINGS

The present disclosure can be better understood by reading the subsequent detailed description and examples with references made to the accompanying drawings.

Additionally, it should be appreciated that in the flow diagram of the present disclosure, the order of execution for each blocks can be changed, and/or some of the blocks can be changed, eliminated, or combined.

DETAILED DESCRIPTION OF THE INVENTION

In order to make the above-mentioned purpose, features and advantages of the present disclosure more obvious and understandable, a preferred embodiment is specifically cited below, and in conjunction with the accompanying drawings, it is described in detail as follows.

Figure 1:
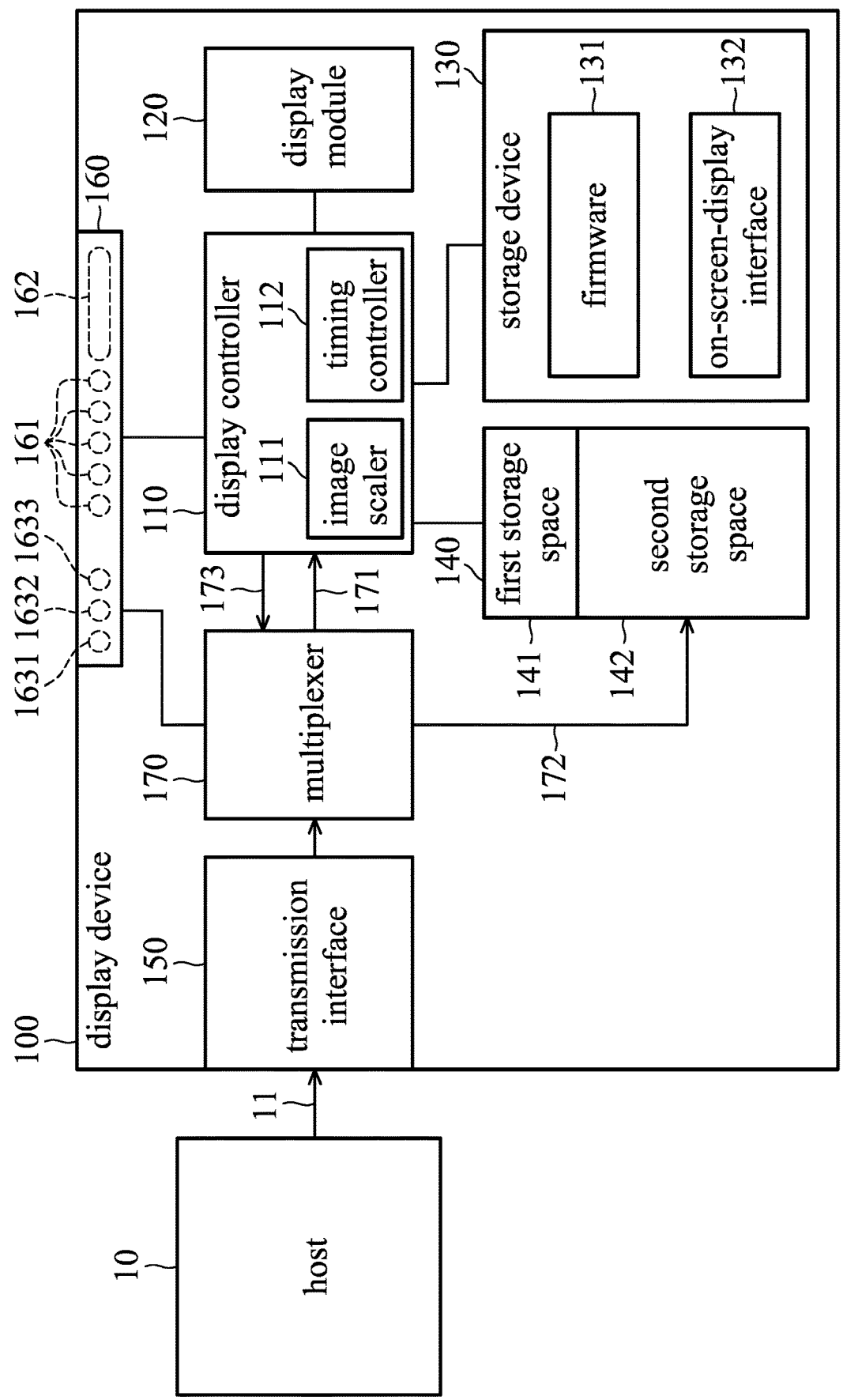
FIG. 1 is a block diagram of a display device, according to an embodiment of the present disclosure.

FIG. 1 is a block diagram of a display device, according to an embodiment of the present disclosure.

As shown in FIG. 1, the host 10 is connected to the display device 100. For example, the host 10 can be a personal computer, a server, a TV stick/TV box, a set-top box, a game console, a DVD/Blu-ray player, or other devices with image output function. The display device 100 can be, for example, a flat panel display, a television, a projector, a computer monitor, etc., but the present disclosure is not limited thereto. The display device 100 includes a display controller 110, a display module 120, a storage device 130, an image buffer 140, a transmission interface 150, an input interface 160 and a multiplexer circuit 170.

The display controller 110 can be, for example, an application-specific integrated circuit (ASIC), a system-on-chip (SoC), a processor, or a microcontroller, but the present disclosure is not limited thereto.

The display module 120 can be, for example, a liquid crystal panel (including a backlight module), a light-emitting diode panel, an organic light-emitting diode panel, a cathode ray tube, an electronic ink (E-Ink) display module, an electroluminescent display module, a plasma display module, a projection display module, a Quantum Dot display module, but the present disclosure is not limited thereto.

The storage device 130 can be, for example, a non-volatile memory, such as a read-only memory (ROM), an erasable programmable read-only memory (EPROM), an electronically erasable programmable read-only memory (EEPROM). The storage device 130 is used for storing the firmware 131 related to the display device 100. The storage device 130 can be external to the display controller 110, or can be integrated into the display controller 110, for example.

The firmware 131 includes, for example, display settings of the on-screen-display interface of the display device 100 and extended display identification data (EDID), display settings, and one or more on-screen-display (OSD) interface 132. The extended display identification data includes, for example, the manufacturer of the display device 100, product name, resolution, display frames per second, and so on. The display settings include, for example, settings of the brightness, contrast, sharpness, and color temperature of the display device 100.

The transmission interface 150 may include a wired transmission interface and/or a wireless transmission interface. The wired transmission interface may include: a high definition multimedia interface (HDMI), a display port (DP) interface, an embedded Display Port (eDP) interface, a universal serial bus (USB) interface, a USB Type-C interface, a Thunderbolt interface, a Digital Video Interface (DVI), a Video Graphics Array (VGA) interface, a general-purpose input-output (GPIO) interface, a universal asynchronous transceiver (UART) interface, a serial peripheral interface (SPI) interface, an integrated circuit bus (I2C) interface, or the combination thereof. The wireless transmission interface may include: Bluetooth, WiFi, NFC interface, etc., but the present disclosure is not limited thereto.

In an embodiment, the display controller 110 can read the program codes of the firmware 131 and the on-screen-display interface 132 stored in the storage device 130 through a bus (such as an I2C bus), and thereby set related display parameters. In addition, the display controller 110 can also transmit the extended display identification data of the display device 100 to the host 10 through the transmission interface 150, so that the host 10 can set the resolution of the image signal to be output, and the related synchronization signals. The on-screen-display interface 132 includes, for example, an on-screen-display menu (OSD Menu) and options, an information dashboard, a timer, a counter, a crosshair, a specific symbol, a specific color, a specific text, or the combination thereof, but the present disclosure is not limited thereto.

In an embodiment, the display controller 110 includes an image scaler 111 and a timing controller 112. The display controller 110 receives the image signal from the host 10 and/or the image signal from other hosts through the transmission interface 150, and the image scaler 111 can perform image resizing process and/or image superposition process on the image in the received image signal 11 so as to meet the resolution of the display module 120. The image after the image resizing process (e.g., called the "output image") is stored in the image buffer 140. The timing controller 112 controls the display module 120 to read the output image from the image buffer 140 and play it.

In another embodiment, the display controller 110 may include a timing controller 112, and the resolution of the image signal 11 from the host 10 conforms to the resolution of the display module 120. Therefore, after the display controller 110 receives the image signal from the host 10, it can store the image signal in the image buffer 140 without performing image resizing process. The timing controller 120 can read the output image from the image buffer 140, and control the display module 120 to play the output image.

The image buffer 140 can be, for example, a volatile memory (such as a dynamic random access memory) or a non-volatile memory (such as a flash memory), which is used for storing the image signal 11 from the host 10, or storing the image signal 11 compressed by the display controller 110. Additionally, the image buffer 140 can store the image signal in a predetermined period of time (e.g., 10 minutes or longer) for use by the image rewinding function of the display device 100.

For example, the image buffer 140 includes a first storage space 141 and a second storage space 142. When the display device 100 receives the image signal 11 from the host computer 10 through the transmission interface 150, the multiplexer 170 will transmit the image signal 11 to the display controller 110 through the path 171, and/or write the image signal 11 into the first storage space 141 of the image buffer 140 through the path 172. The first storage space 140 is, for example, used as an output image buffer in the normal image mode, and the second storage space 142 is, for example, used as an output image buffer in the image-rewinding mode.

The input interface 160 is used for enabling/disabling the on-screen-display menu and the image rewinding function the display device 100. In some embodiments, the input interface 160 can be implemented by, for example, a five-way joystick 162 or five physical buttons 161, so as to implement commands such as up, down, left, right, and confirmation. In addition, the input interface 160 further includes one or more function keys 1631-1633, wherein the function key 1632 is used for enabling or disabling the image-rewinding function of the display device 100, and the function keys 1631 and 1632 execute the play-backward and play-forward functions.

In an embodiment, when the user operates one of the directions of the five-way joystick 162 (or presses one of the physical buttons 161), the display controller 110 can read the firmware 132, the on-screen-display menu in the on-screen-display interface, and the program code of related options from the storage device 130, and display the on-screen-display menu and the related options on the display module 120. In an embodiment, the user can operates on the input interface 160 to control the on-screen-display menu of the display device 100, so as to adjust the brightness, contrast, sharpness, color temperature of the display module 120, or to enable or disable other interfaces in the on-screen-display interface 132. For example, the firmware 131 can be regarded as, for example, the default firmware of the display device 100. The user can control the option settings of the on-screen-display interface 132 displayed on the display device 100 through the five-way joystick 162 (or the physical buttons 161).

In another embodiment, the display device 100 of the present disclosure is not limited to use the function buttons 1631-1633 to perform the image rewinding function. The user can also operate through the input interface 160 to enable the on-screen-display interface 132 related to the image rewinding function, and can operate the physical buttons 161 or the five-way joystick 162 in the input interface 160 to control the enablement/disablement of the image rewinding function, as well as the play-backward and play-forward functions.

In some embodiments, the display controller 100 uses a first-in-first-out mechanism to store the image signal 11 (or the compressed image signal) into the second storage space in the image buffer 140. For example, the host 10 or the display device 100 can pre-set the capacity of the second storage space 142 in the image buffer 140, which corresponds to the number of output images that can be stored, meaning that the above-mentioned number can be converted into the duration of the image signal of the image rewinding function.

Specifically, in some embodiments, the display controller 100, for example, can directly store the output image (e.g., an RGB image) used for the image rewinding function in the second storage space 142. When the image rewinding function of the display device 100 is enabled, the display controller 100 can use the control signal of the image rewinding function to directly obtain the retrospective image at the retrospective time point to be played from the second storage space 142, and play the retrospective image on the display module 120.

In other embodiments, the display controller 110 first performs image compression (or video compression) on the image signal 11 used for the image rewinding function to obtain a compressed image, and stores the compressed image in the second storage space 142. When the image rewinding function of the display device 100 is enabled, the display controller 100 can use the control signal of the image rewinding function to directly obtain the compressed image that corresponds to the retrospective time point to be played from the second storage space 142, and decompress the compressed image to obtain the retrospective image to be played on the display module 120. Thus, the retrospective image is played on the display module 120.

It should be noted that no matter whether the display controller 110 performs image compression on the image signal to be stored in the second storage space 142, the display controller 110 always uses the first-in-first-out mechanism to store the image signal or the compressed image signal in the second storage space 142. In other words, when the total capacity of the stored image signal or of the compressed image signal exceeds the capacity of the second storage space 142, the display controller 110 will remove the earliest predetermined number of image signals or compressed image signals in the second storage space 142, and write the image signal or the compressed image signal at the latest time point into the second storage space 142.

When the user enables the image rewinding function of the display device 100 through the function button 1632 or the on-screen-display interface 132 at the time point T1, it means that the display controller 110 will start playing the retroactive image signal on the display module 120 at the time point T1, so the user does not need to watch the image from the host 10 temporarily. At this time, the switch circuit (not shown) in the multiplexer 170 will receive the trigger signal of the image rewinding function from the input interface 160 to disconnect the path 172, which means that the display controller 110 will no longer write the image signal 11 from the host 10 at the time point T1. If the user enables the image rewinding function of the display device 100 at the time point T1, the user can only search for the retrospective images within a predetermined period of time before the time point T1 through the function button 1631. When the display device 100 is in the image-rewinding mode and the user searches forward for the retrospective image through the function button 1633, the display controller 110 can only search forward for the retrospective image up to the time point T1 at most.

In some embodiments, if the display device 100 is already in the image-rewinding mode, whenever the user presses the function button 1631 once and then releases it, the display controller 110 will search backward for a predetermined number of seconds (e.g., 5 seconds or 10 seconds) from the current search time point to obtain the retrospective image at the corresponding search time point, and set the current search time point as the time point that corresponds to the above described retrospective image. When the user holds down the function button 1631 for more than a predetermined number of seconds (e.g., 2 seconds), the display controller 110 will continuously search for the retrospective image fast backward from the current search time point. After the user releases the function button 1631, the display controller 110 stops searching backward for the retrospective image.

Similarly, whenever the user presses the function button 1633 once and releases it, the display controller 110 will search forward for a predetermined number of seconds (e.g., 5 seconds or 10 seconds) from the current search time point to obtain the retrospective image at the corresponding search time point, and set the current search time point as the time point that corresponds to the above described retrospective image. When the user holds down the function button 1633 for more than a predetermined number of seconds (e.g., 2 seconds), the display controller 110 will continuously search for the retrospective image fast forward from the current search time point. After the user releases the function button 1633, the display controller 110 stops searching forward for the retrospective image.

Figure 2C:
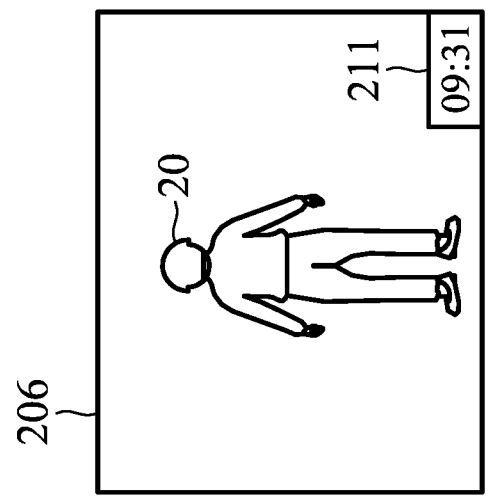
FIGS. 2A-2C are schematic diagrams of a retrospective image, according to an embodiment of the present disclosure.
Figure 2B:
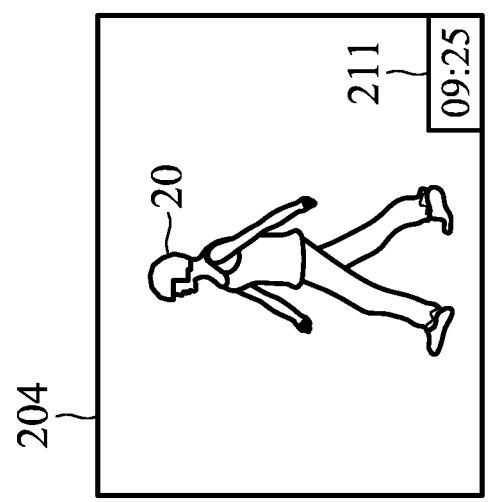
Figure 2A:
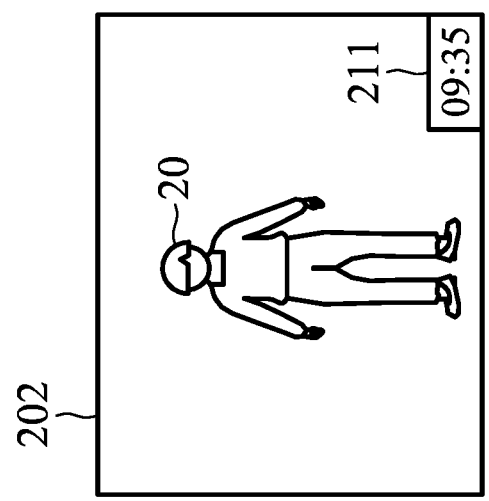

FIGS. 2A-2C are schematic diagrams of a retrospective image, according to an embodiment of the present disclosure. Please refer to FIG. 1 and FIG. 2A-2C at the same time.

Assuming that the user enables the image rewinding function of the display device 100 through the function button 1632 at time 09:35 (i.e., the time point T1), the display controller 110 will first obtain the retrospective image 202 at time 09:35 from the second storage space 142, and play the retrospective image 202 on the display module 120. The retrospective image 202 includes a time column 211 to display the time point that corresponds to the retrospective image 202, and at this time the user 20 is facing forward, as shown in FIG. 2A.

Assuming that the second storage space 142 of the display device 110 can store an image signal with a length of 10 minutes at most, when the user presses the function button 1631 to continuously perform image rewinding, the display controller 110 can obtain the retrospective image 204 at 10 minutes (at most) before 09:35. The retrospective image 204 also includes a time column 211 to display the time point that corresponds to the retrospective image 204, and the user 20 is facing left at this time, as shown in FIG. 2B.

Next, when the user searches forward through the function button 1633, the display controller 110 can search forward for the retrospective image at time 09:35 at most. If the user watches the retrospective image 206 at time 09:31 through the function button 1633, the retrospective image 206 also includes a time column 211 to display the time point that corresponds to the retrospective image 206, and at this time the user 20 is facing backward, as shown in FIG. 2C.

It should be noted that when the user searches forward or backward through the function buttons 1631 or 1633, there is still a time limit. Specifically, the backward search can only search for retrospective images within a predetermined time period (e.g., 10 minutes) before the time point T1 at most. The forward search can only search for the retrospective image forward from the earliest time point that is a predetermined time period before the time point T1 (i.e., 10 minutes before time point T1) to the time point T1 at most.

Figure 3:
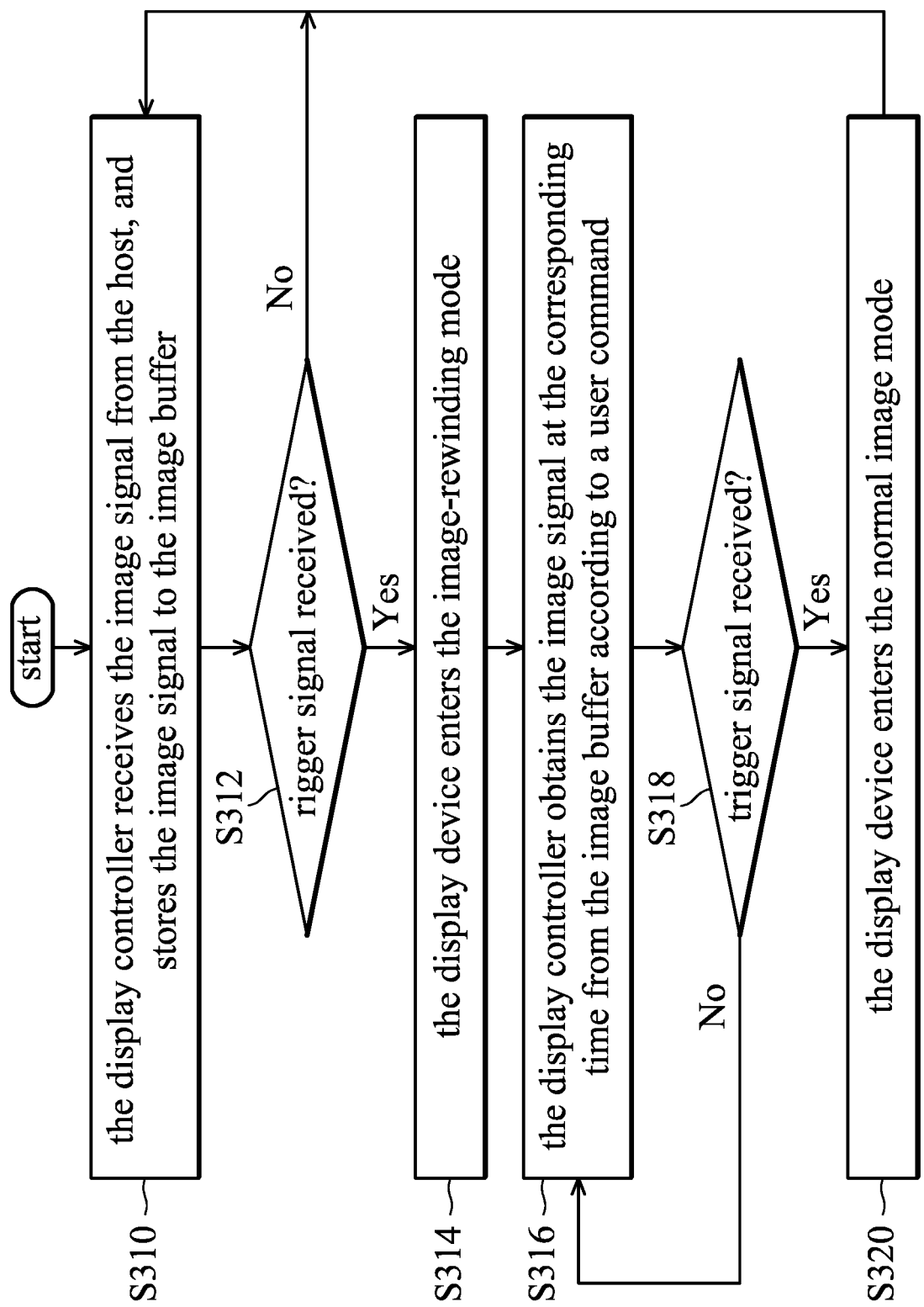
FIG. 3 is a flow chart of an image rewinding method of a display device, according to an embodiment of the present disclosure.

FIG. 3 is a flow chart of an image rewinding method of a display device, according to an embodiment of the present disclosure. Please refer to FIG. 1 and FIG. 3 at the same time.

In step S310, the display controller 110 receives the image signal 11 from the host 10, and stores the image signal 11 in the image buffer 140. For example, in some embodiments, the display controller 100 can directly store the output image (e.g., an RGB image) used for the image rewinding function in the second storage space 142. When the image rewinding function of the display device 100 is enabled, the display controller 100 can use the control signal of the image rewinding function to directly obtain the retrospective image signal that is at the retrospective time point to be played from the second storage space 142, and play the retrospective image signal on the display module 120.

In other embodiments, the display controller 100 first performs image compression (or video compression) on the image signal 11 used for the image rewinding function to obtain a compressed image, and stores the compressed image in the second storage space 142. When the image rewinding function of the display device 100 is enabled, the display controller 100 can use the control signal of the image rewinding function to directly obtain the compressed image that corresponds to the retrospective time point to be played from the second storage space 142, and perform image decompression on the compressed image to obtain the retrospective image to be played on the display module 120. Thus, the retrospective image is played on the display module 120.

In step S312, it is determined whether a trigger signal is received. When it is determined that the trigger signal is received, step S314 is executed. When it is determined that the trigger signal is not received, return to step S312. For example, the function button 1632 of the input interface 160 is used to enable or disable the image rewinding function of the display device 100, meaning that when the user presses the function button 1632 and then releases it, the trigger signal can be generated and transmitted to the multiplexer 170 and the display controller 110.

In step S314, the display device 100 enters the image rewinding mode. For example, in response to receiving the trigger signal (e.g., at time point T1), the display controller 110 controls the display device 100 to enter the image-rewinding mode, and the switch circuit 172 of the multiplexer 170 will disconnect the path, meaning that the controller 110 will no longer write the image signal 11 from the host 10 into the second storage space 142 at the time point T1. If the user enables the image rewinding function of the display device 100 at the time point T1, the user can only search for the retrospective images within a predetermined time period before the time point T1 through the function button 1631. When the display device 100 is in the image-rewinding mode and the user searches forward for the retrospective image through the function button 1633, the display controller 110 can only search forward the retrospective image up to the time point T1 at most.

In step S316, the display controller 110 obtains the image signal at the corresponding time from the image buffer according to the user command. For example, when the display device 100 is in the image-rewinding mode, the user can open the on-screen-display interface 132 related to the image rewinding function through the function button 1631 or 1633, or through the input interface 160, and can operate the physical buttons 161 or the five-way joystick 162 in the interface 160 to control the enablement/disablement of the image rewinding function, as well as the play-backward and play-forward functions. In some embodiments, when the image rewinding function of the display device 100 is enabled, the display controller 100 can use the control signal of the image rewinding function to directly obtain the retrospective image that is at the retrospective time point to be played from the second storage space 142, and play the retrospective image on the display module 120. In some other embodiments, when the image rewinding function of the display device 100 is enabled, the display controller 100 can use the control signal of the image rewinding function to directly obtain the compressed image that corresponds to the retrospective time point to be played from the second storage space 142, and perform image decompression on the compressed image to obtain the retrospective image to be played on the display module 120. Thus, the retrospective image is played on the display module 120.

In step S318, it is determined whether a trigger signal is received. When it is determined that a trigger signal is received, step S320 is executed. When it is determined that the trigger signal is not received, return to step S316. For example, the above-described trigger signal is used to switch the normal image mode or the image-rewinding mode of the display device 100. When the display device 100 is already in the image-rewinding mode, if the display controller 110 determines that the trigger signal is received again, the display controller 110 controls the display device 100 to enter the normal image mode.

In step S320, the display device 100 enters the normal image mode. For example, the first storage space 140 is used as an output image buffer under the normal image mode. That is, in the normal image mode, the display controller 110 will obtain the output image from the first storage space 141, and play the output image on the display module 120.

To sum up, the present disclosure provides a display device and an image-rewinding method thereof, where the user can use the built-in image rewinding function of the display device to browse the images within a predetermined time period, thereby facilitating the user to recall the previous operations performed on the host or to browse the images that the user has watched before, so as to enhance the user experience.

Terms such as "first", "second", and "third" are used to modify the elements in the claims, and are not used to indicate that there is a priority order, a prior relationship between them, or one element precedes another, or the chronological order in which method steps are performed, are only used to distinguish elements with the same name.

While the present disclosure is described above with preferred embodiments, it is not intended to limit the scope of the present disclosure. Anyone persons skilled in the art can make some changes and modifications without departing from the spirit and scope of the present disclosure. Therefore, the scope of the present disclosure should be determined by the appended claims.

What is claimed is:

1. A display device, comprising:
an image buffer;
a display module; and
a display controller, used for receiving an image signal from a host, and storing the image signal in the image buffer;
wherein in response to the display controller receiving a trigger signal, the display controller controls the display device to enter an image-rewinding mode;
wherein the display controller obtains a retrospective image that corresponds to a retrospective time point according to a user command, and plays the retrospective image on the display module; and
wherein the display controller stops writing the image signal to the image buffer, in response to the display device entering the image-rewinding mode.

2. The display device as claimed in claim 1, wherein the display controller compresses the image signal to obtain a compressed image signal, and stores the compressed image signal to the image buffer;
wherein when the display device is in the image-rewinding mode, the display controller obtains the compressed image signal that corresponds to the retrospective time point from the image buffer, and decompresses the compressed image signal to obtain the retrospective image.

3. The display device as claimed in claim 2, wherein the image buffer stores the compressed image signal within a predetermined period of time, and the display controller stores the compressed image signal to the image buffer using a first-in-first-out mechanism.

4. The display device as claimed in claim 1, further comprising an input interface, wherein the input interface comprises a first function button, a second function button, and a third function button;
wherein the second function button is used for generating the trigger signal to enable or disable the image-rewinding mode of the display device; and
wherein the first function button and the third function button are used for generating the user command, and respectively controlling a play-backward function and a play-forward function in the image-rewinding mode.

5. The display device as claimed in claim 4, wherein when the display device is in the image-rewinding mode and a user presses and then releases the first function button or the third function button, the display controller obtains the retrospective time point by searching forward or backward for a predetermined number of seconds from a current search time point, and obtains the retrospective image that corresponds to the retrospective time point from the image buffer.

6. The display device as claimed in claim 4, wherein when the display device is in the image-rewinding mode and a user holds down the first function button or the third function button, the display controller searches for the retrospective image fast forward or backward from a current search time point.

7. The display device as claimed in claim 4, wherein when the display device is in the image-rewinding mode and the display controller receives the trigger signal from the second function button, the display controller controls the display device to return to a normal image mode.

8. An image rewinding method of a display device, wherein the display device comprises an image buffer, a display module, and a display controller, the method comprising:
using the display controller to receive an image signal from a host, and to store the signal to the image buffer;
using the display controller to control the display device to enter an image-rewinding mode, in response to the display controller receiving a trigger signal;
using the display controller to obtain a retrospective image that corresponds to a retrospective time point according to a user command, and to play the retrospective image on the display module; and
using the display controller to stop writing the image signal to the image buffer, in response to the display device entering the image-rewinding mode.

9. The image rewinding method of the display device as claimed in claim 8, further comprising:
using the display controller to compress the image signal to obtain a compressed image signal, and to store the compressed image signal to the image buffer; and
when the display device is in the image-rewinding mode, using the display controller to obtain the compressed image signal that corresponds to the retrospective time point from the image buffer, and to decompress the compressed image signal to obtain the retrospective image.

10. The image rewinding method of the display device as claimed in claim 9, wherein the image buffer stores the compressed image signal within a predetermined period of time, the method further comprising:
using the display controller to store the compressed image signal to the image buffer using a first-in-first-out mechanism.

11. The image rewinding method of the display device as claimed in claim 8, wherein the display device further comprises an input interface, wherein the input interface comprises a first function button, a second function button, and a third function button;
wherein the second function button is used for generating the trigger signal to enable or disable the image-rewinding mode of the display device; and
wherein the first function button and the third function button are used for generating the user command, and to respectively control a play-backward function and a play-forward function in the image-rewinding mode.

12. The image rewinding method of the display device as claimed in claim 11, further comprising:
when the display device is in the image-rewinding mode and a user presses and then releases the first function button or the third function button, using the display controller to obtain the retrospective time point by searching forward or backward for a predetermined number of seconds from a current search time point, and to obtain the retrospective image that corresponds to the retrospective time point from the image buffer.

13. The image rewinding method of the display device as claimed in claim 11, further comprising:
when the display device is in the image-rewinding mode and a user holds down the first function button or the third function button, using the display controller to search for the retrospective image fast forward or backward from a current search time point.

14. The image rewinding method of the display device as claimed in claim 11, further comprising:

when the display device is in the image-rewinding mode and the display controller receives the trigger signal from the second function button, using the display controller to control the display device to return to a normal image mode.

* * * * *